US007243179B2

(12) United States Patent
Apostol, Jr. et al.

(10) Patent No.: US 7,243,179 B2
(45) Date of Patent: *Jul. 10, 2007

(54) ON-CHIP INTER-SUBSYSTEM COMMUNICATION

(75) Inventors: George Apostol, Jr., Santa Clara, CA (US); Mahadev S. Kolluru, San Jose, CA (US)

(73) Assignee: Cavium Networks, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/422,373

(22) Filed: Jun. 6, 2006

(65) Prior Publication Data

US 2006/0212632 A1 Sep. 21, 2006

Related U.S. Application Data

(63) Continuation of application No. 10/086,665, filed on Feb. 28, 2002, now Pat. No. 7,096,292.

(60) Provisional application No. 60/272,439, filed on Feb. 28, 2001.

(51) Int. Cl.
*G06F 13/14* (2006.01)

(52) U.S. Cl. ......................... 710/244; 710/40; 711/147

(58) Field of Classification Search ................ 710/107, 710/112, 40, 28, 244; 711/131, 119, 120, 711/151, 147
See application file for complete search history.

(56) References Cited

U.S. PATENT DOCUMENTS

| | | | |
|---|---|---|---|
| 4,697,262 | A | 9/1987 | Segal et al. |
| 5,185,864 | A | 2/1993 | Bonevento et al. |
| 5,197,130 | A | 3/1993 | Chen et al. |
| 5,222,223 | A | 6/1993 | Webb, Jr. et al. |
| 5,224,166 | A | 6/1993 | Hartman, Jr. |
| 5,388,261 | A | 2/1995 | Anderson et al. |
| 5,657,472 | A | 8/1997 | Van Loo et al. |
| 5,799,207 | A | 8/1998 | Wang et al. |
| 5,812,799 | A | 9/1998 | Zuravleff et al. |
| 5,848,367 | A | 12/1998 | Lotocky et al. |
| 5,905,876 | A | 5/1999 | Pawlowski et al. |
| 6,034,542 | A | 3/2000 | Ridgeway |
| 6,058,474 | A | 5/2000 | Baltz et al. |
| 6,118,462 | A | 9/2000 | Margulis |
| 6,122,690 | A | 9/2000 | Nannetti et al. |
| 6,185,520 | B1 | 2/2001 | Brown et al. |
| 6,317,803 | B1 | 11/2001 | Rasmussen et al. |
| 6,321,285 | B1 | 11/2001 | Sheafor et al. |
| 6,321,318 | B1 | 11/2001 | Baltz et al. |
| 6,347,344 | B1 | 2/2002 | Baker et al. |
| RE37,980 | E | 2/2003 | Elkhoury et al. |
| 6,557,078 | B1 | 4/2003 | Mulla et al. |

(Continued)

*Primary Examiner*—Mark H. Rinehart
*Assistant Examiner*—Clifford Knoll
(74) *Attorney, Agent, or Firm*—Hamilton, Brook, Smith & Reynolds, P.C.

(57) ABSTRACT

A data transfer interface includes facilities for a subsystem including the data transfer interface to internally prioritize transactions with other subsystems, using facilities of the data transfer interface. In one embodiment, the subsystem also includes with the transactions bus arbitration priorities to facilitate prioritization and granting of access to an on-chip bus to the contending transactions. In one embodiment, an integrated circuit includes the on-chip bus and a number of the subsystems interacting with each other through transactions across the on-chip bus.

14 Claims, 9 Drawing Sheets

U.S. PATENT DOCUMENTS 6,681,270 B1 1/2004 Agarwala et al.
6,784,890 B1 8/2004 Bergeson et al.
2001/0026439 A1 10/2001 Geusic et al.
2001/0049726 A1 12/2001 Comeau et al.
2003/0189573 A1 10/2003 Dahlen et al.

Burst Write Timing

Write Followed by Read Timing

Read Followed by Write Timing (different devices)

ON-CHIP INTER-SUBSYSTEM COMMUNICATION

RELATED APPLICATIONS

This application is a continuation of U.S. application Ser. No. 10/086,665, filed Feb. 28, 2002 now U.S. Pat. No. 7,096,292, which claims priority to U.S. Provisional Application No. 60/272,439, filed Feb. 28, 2001. The entire teachings of the above applications are incorporated herein by reference.

FIELD OF THE INVENTION

The present invention relates to the field of integrated circuit. More specifically, the present invention relates to inter-subsystem communication between subsystems on an integrated circuit device.

BACKGROUND INFORMATION

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what's known as "system on a chip" or SOC. Typically, a SOC includes multiple "tightly coupled" subsystems performing very different functions. These subsystems often have a need to communicate and cooperate with each other on a regular basis.

U.S. Pat. No. 6,122,690 discloses an on-chip bus architecture that is both processor independent and scalable. The '690 patent discloses a bus that uses "standardized" bus interfaces to couple functional blocks to the on-chip bus. The "standardized" bus interfaces include embodiments for bus master functional blocks, slave functional blocks, or either. The '690 bus suffers from at least one disadvantage in that it does not offer rich functionalities for prioritizing interactions or transactions between the subsystems, which are needed for a SOC with subsystems performing a wide range of very different functions.

Accordingly, a more flexible approach to facilitate inter-subsystem communication between subsystems on a chip is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes interface units and operational methods for flexibly facilitating inter-subsystem communication between subsystems of a SOC. In the following description, various features and arrangements will be described, to provide a thorough understanding of the present invention. However, the present invention may be practiced without some of the specific details or with alternate features/arrangement. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Overview

Figure 1:
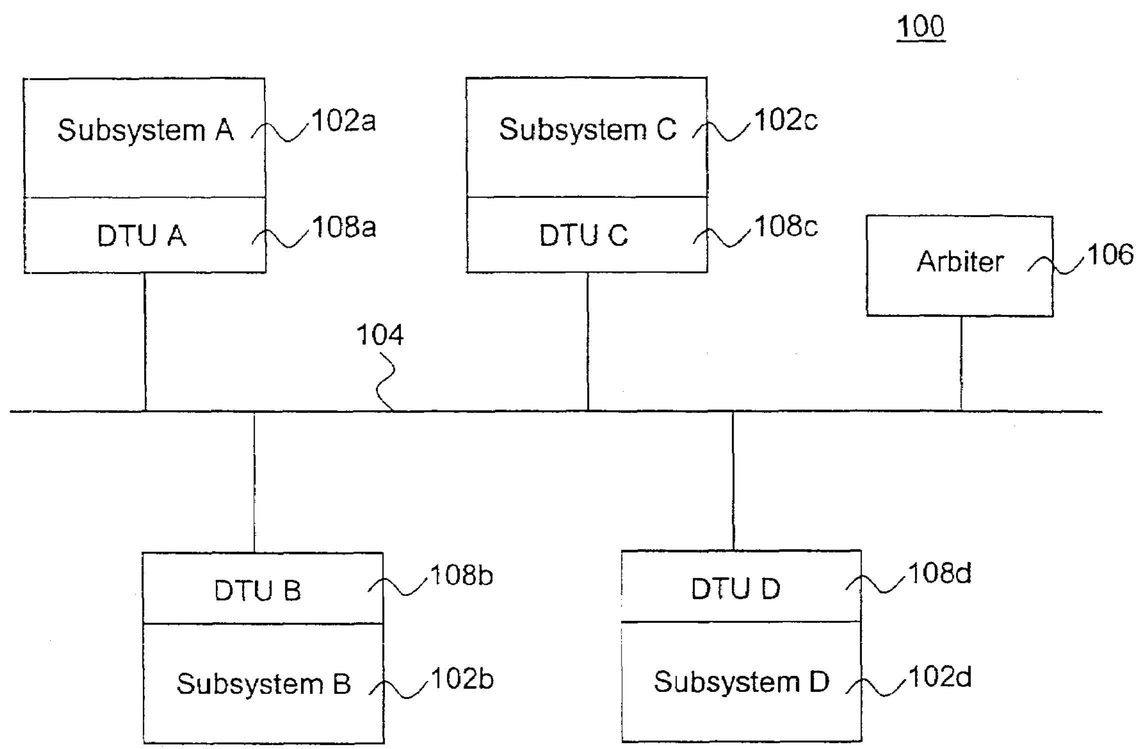
FIG. 1 illustrates an overview of a system on-chip including an on-chip bus and a number of subsystems coupled to the on-chip bus, in accordance with one embodiment.

Referring now to FIG. 1, wherein a block diagram illustrating an overview of a SOC 100 with subsystems 102*a*–102*d* incorporated with the teachings of the present invention for inter-subsystem communication, in accordance with one embodiment, is shown. As illustrated, for the embodiment, SOC 100 includes on-chip bus 104 and subsystems 102*a*–102*d* coupled to each other through bus 104. Moreover, each of subsystems 102*a*–102*d* includes data transfer unit or interface (DTU) 108*a*–108*d* incorporated with teachings of the present invention, correspondingly coupling the subsystems 102*a*–102*d* to bus 104. SOC 100 also includes arbiter 106, which is also coupled to bus 104.

In one embodiment, bus 104 includes a number of sets of request lines (one set per subsystem), a number of sets of grant lines (one set per subsystem), and a number of shared control and data/address lines. Included among the shared control lines is a first control line for a subsystem granted access to the bus (grantee subsystem, also referred to as the master subsystem) to assert a control signal to denote the beginning of a transaction cycle, and to de-assert the control signal to denote the end of the transaction cycle; and a second control line for a subsystem addressed by the grantee/master subsystem (also referred to as the slave subsystem) to assert a control signal to inform the grantee/master subsystem that the addressee/slave subsystem is busy (also referred to as "re-trying" the master system).

As a result of the facilities advantageously provided by DTU 108*a*–108*d*, and the teachings incorporated in subsystem 102*a*–102*d*, subsystems 102*a*–102*d* are able to flexibly communicate and cooperate with each other, allowing subsystems 102*a*–102*d* to handle a wide range of different functions having different needs. More specifically, as will be described in more detail below, in one embodiment, subsystems 102*a*–102*d* communicate with each other via transactions conducted across bus 104. Subsystems 102*a*–102*d*, by virtue of the facilities advantageously provided by DTU 108*a*–108*d*, are able to locally prioritize the order in which its transactions are to be serviced by the corresponding DTU 108*a*–108*d* to arbitrate for access to bus 104. Further, in one embodiment, by virtue of the architecture of the transactions, subsystems 102*a*–102*d* are also able to flexibly control the priorities on which the corresponding DTU 108*a*–108*d* are to use to arbitrate for bus 104 with other contending transactions of other subsystems 102*a*–102*d*.

Arbiter 106 is employed to arbitrate access to bus 104. That is, arbiter 106 is employed to determine which of the contending transactions on whose behalf the DTU 108*a*–108*d* are requesting for access (through e.g. the request lines of the earlier described embodiment), are to be granted access to bus 104 (through e.g. the grant lines of the earlier described embodiment).

SOC 100 is intended to represent a broad range of SOC, including multi-service ASIC. In particular, in various embodiments, subsystems 102*a*–102*d* may be one or more of a memory controller, a security engine, a voice processor, a collection of peripheral device controllers, a framer processor, and a network media access controller.

Moreover, by virtue of the advantageous employment of DTU 108*a*–108*d* to interface subsystems 102*a*–102*d* to on-chip bus 104, with DTU 108*a*–108*d* and on-chip bus operating on the same clock speed, the core logic of subsystems 102*a*–102*d* may operate in different clock speeds, including clock speeds that are different from the clock speed of non-chip bus 104 and DTU 108*a*–108*d*. In one embodiment, one or more subsystems 102*a*–102*d* may be a multi-function subsystems, in particular, with the functions identified by identifiers. Except for the teachings of the present invention incorporated into subsystems 102*a*–102*d*, the exact constitution and the exact manner their core logic operate in providing the functions/services the subsystems are immaterial to the present invention. While for ease of understanding, SOC 100 is illustrated as having only four subsystems 102*a*–102*d*, in practice, SOC 100 may have more or less subsystems. In particular, by virtue of the advantageous employment of DTU 108*a*–108*d* to interface subsystems 102*a*–102*d* to on-chip bus 104, zero or more selected ones of subsystems 102*a*–102*d* may be removed, while other subsystems 102*a*–102*d* may be flexibly added to SOC 100.

Similarly, arbiter 106 may be any one of a number of bus arbiters known in the art. The facilities of DTU 108*a*–108*d* and the teachings incorporated into the core logic of subsystems 102*a*–102*d* to practice the present invention will be described in turn below.

Method

Figure 2:
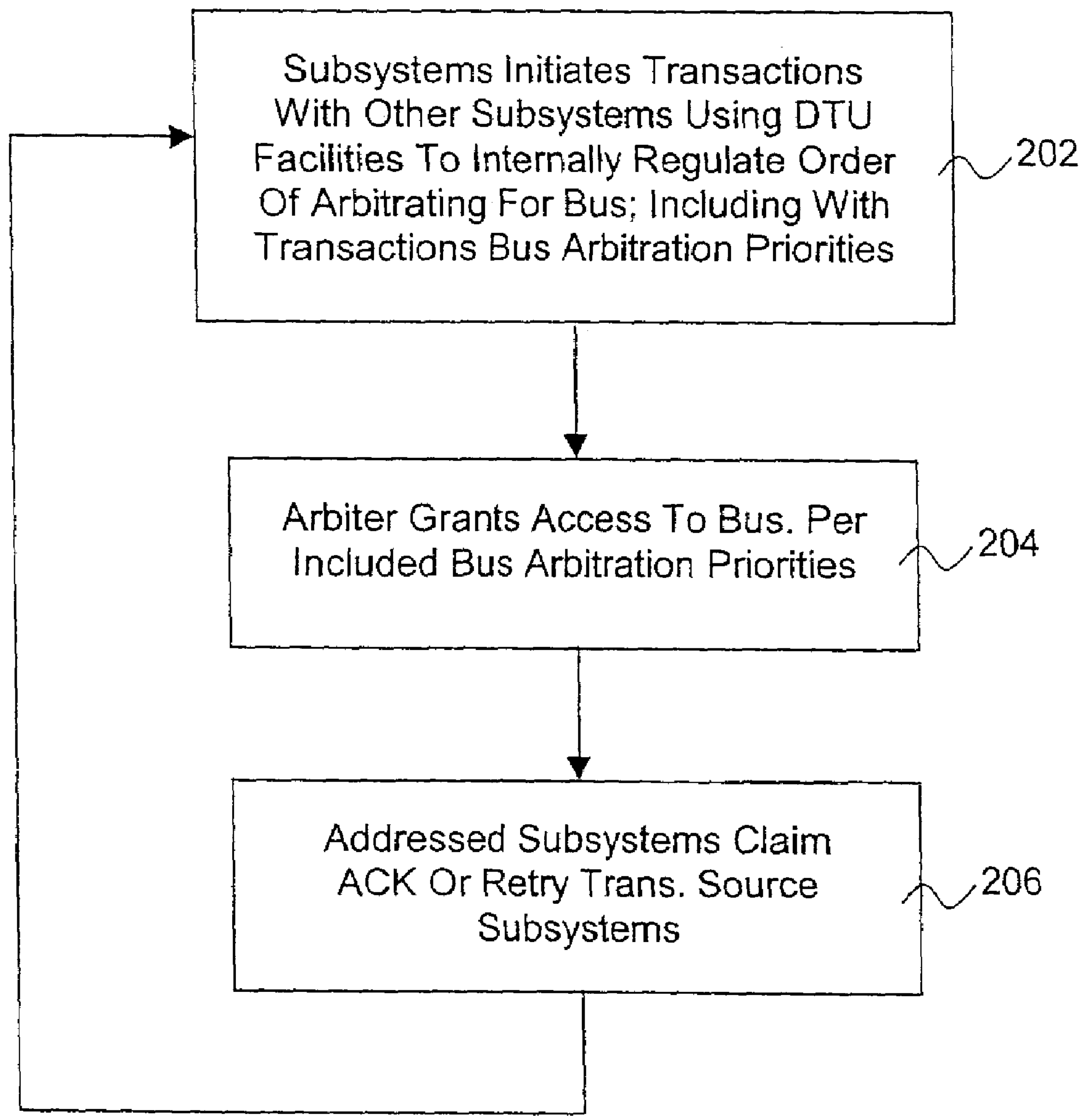
FIG. 2 illustrates the method of the present invention, in accordance with one embodiment.

Referring now to FIG. 2, wherein a flow chart illustrating a method of the present invention, in accordance with one embodiment, is shown. As illustrated, in accordance with the present invention, subsystems 102*a*–102*d* initiate transactions with one another, using the facilities of their corresponding DTU 108*a*–108*d* to locally prioritize the order the transactions of the corresponding subsystems are to be serviced, for arbitration for access to bus 104, block 202.

Further, for the embodiment, for each transaction, each subsystem 102*a*–102*d* also includes as part of the transaction the bus arbitration priority the corresponding DTU 108*a*–108*d* is to use to arbitrate for access to bus 104, when servicing the transaction in the prioritized manner.

In response, DTU 108*a*–108*d* service the transactions of the respective subsystems 102*a*–102*d* accordingly, and arbitrating for access to bus 104, using the bus arbitration priorities included among the transactions. Arbiter 106 in turn grants accesses to bus 104 based on the bus arbitration priorities of the contending transactions, block 204.

In one embodiment, arbiter 106 grants access strictly by the transaction priorities, e.g. in a three priority implementation, all high priority transactions will be granted access first, before the medium priority transactions are granted access, and finally the low priority transactions are granted access. In another embodiment, arbiter 106 further employs certain non-starvation techniques, to ensure the medium and/or low priority transactions will also be granted access to bus 104. The non-starvation techniques may be any one of a number of such techniques known in the art.

Still referring to FIG. 2, once granted access to bus 104, the grantee DTU 108* places the grantee transaction on bus 104 (through e.g. the shared data/address lines of the earlier described embodiment). In one embodiment, the transaction includes address of the targeted subsystem 102*. In response, once placed onto bus 104, the addressee subsystem 102* claims the transaction, and acknowledges the transaction, or if the subsystem 102* is busy, instructs the requesting subsystem 102* to retry later, block 206. If acknowledgment is given and a reply is due (as in the case of a read request), the reply is later initiated as a reply transaction. In other words, for the embodiment, "read" transactions are accomplished in a "split" manner.

In the present application, for ease of designation, the trailing "*" of a reference number denotes one of the instances of reference. For example, 108* means either 108*a*, 108*b*, 108*c* or 108*d*.

Exemplary Transaction Formats

Figure 3A:
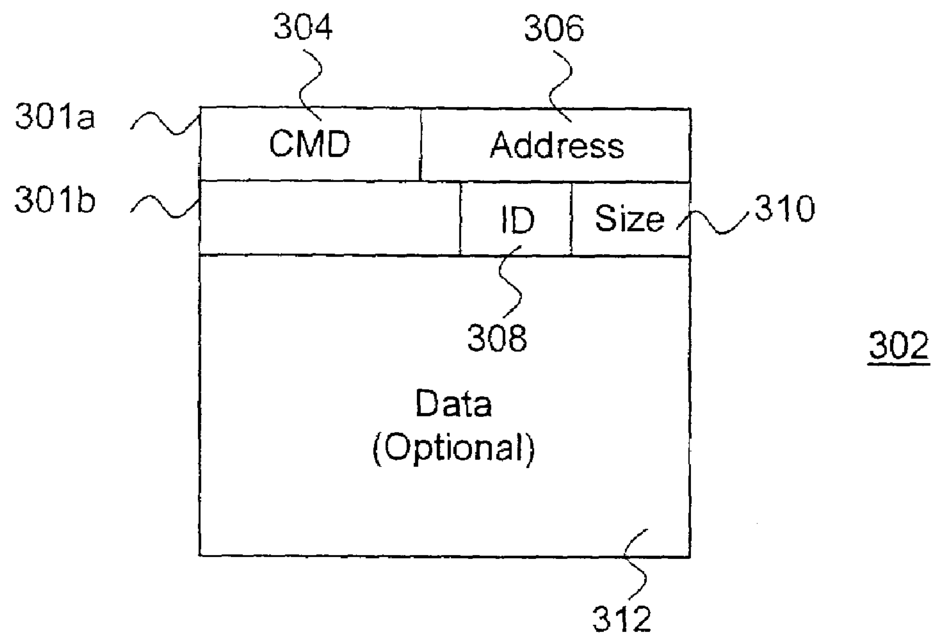
FIGS. 3*a*–3*b* illustrate a request and a reply transaction between two subsystems, in accordance with one embodiment.
Figure 3B:
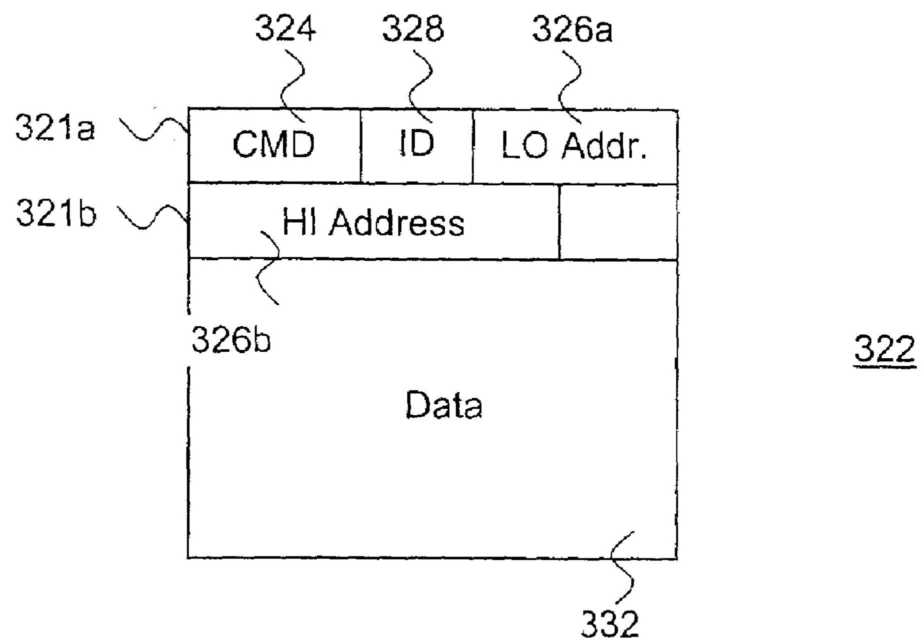

FIGS. 3*a*–3*b* illustrate two exemplary transaction formats, a request format and a reply format, suitable for use to practice the present invention, in accordance with one embodiment. As illustrated in FIG. 3*a*, exemplary request transaction 302 includes three parts, first header 301*a*, second header 301*b*, and optional data portion 312. First header 301*a* includes in particular, a command or request code 304, which for the embodiment, includes the bus arbitration priority, and address 306 of the target subsystem 102*. The various subsystems 102*a*–102*d* of SOC 100 are assumed to be memory mapped. Arbitration is initiated by a DTU 108* requesting arbiter 106 for access (through e.g. the earlier described subsystem based request lines), including with the request the included bus arbitration priority in the command portion 304 of first header 301*a*. Second header 301*b* includes an identifier identifying a function of the originating subsystem 102*, allowing subsystem 102* to be a multi-function subsystem and be able to associate transactions with the various functions. Second header 301*b* also includes size 310. For write transactions, size 310 denotes the size of the write data to follow (the "optional" data portion), in number of bytes. For read transactions, size 310 denotes the size of the data being accessed (i.e. read), also in number of bytes.

As illustrated in FIG. 3*b*, exemplary reply transaction 322 also includes three parts, first header 321*a*, second header 321*b* and data 332. First header 321*a* includes in particular, a command or request code 324, which includes the bus arbitration priority, identifier 328 which identifies the subsystem and its function, and low order byte of targeted address 326*a* of the replying subsystem 102*. As alluded earlier, data 332 includes the data being accessed/read by the original read request. Again, arbitration is initiated by a DTU 108* requesting arbiter 106 for access (through e.g. the earlier described subsystem based request lines), including with the request the included bus arbitration priority in the command portion 324 of first header 321*a*. Second header 321*b* includes the remaining high order bytes targeted address 326*a* of the replying subsystem 102*. Accordingly, employment of these transaction formats enables a subsystem 102* to communicate with another subsystem 102* at any byte position, reducing the number of operations for unaligned data transfers.

In one embodiment, different commands are supported for "conventional" data versus control, and voice data. More specifically, for the embodiment, the commands supported are:

| Command Code | Command | Description |
|---|---|---|
| 000 | Reserved | Reserved |
| 001 | DRead | Data Read Request |
| 010 | CRead | Control Read Request |
| 011 | VRead | Voice Read Request |
| 100 | DWrite | Data Write Request |
| 101 | CWrite | Control Write Request |
| 110 | VWrite | Voice Write Request |
| 111 | Reply | Read Reply |

Data Transfer Units

Figure 4:
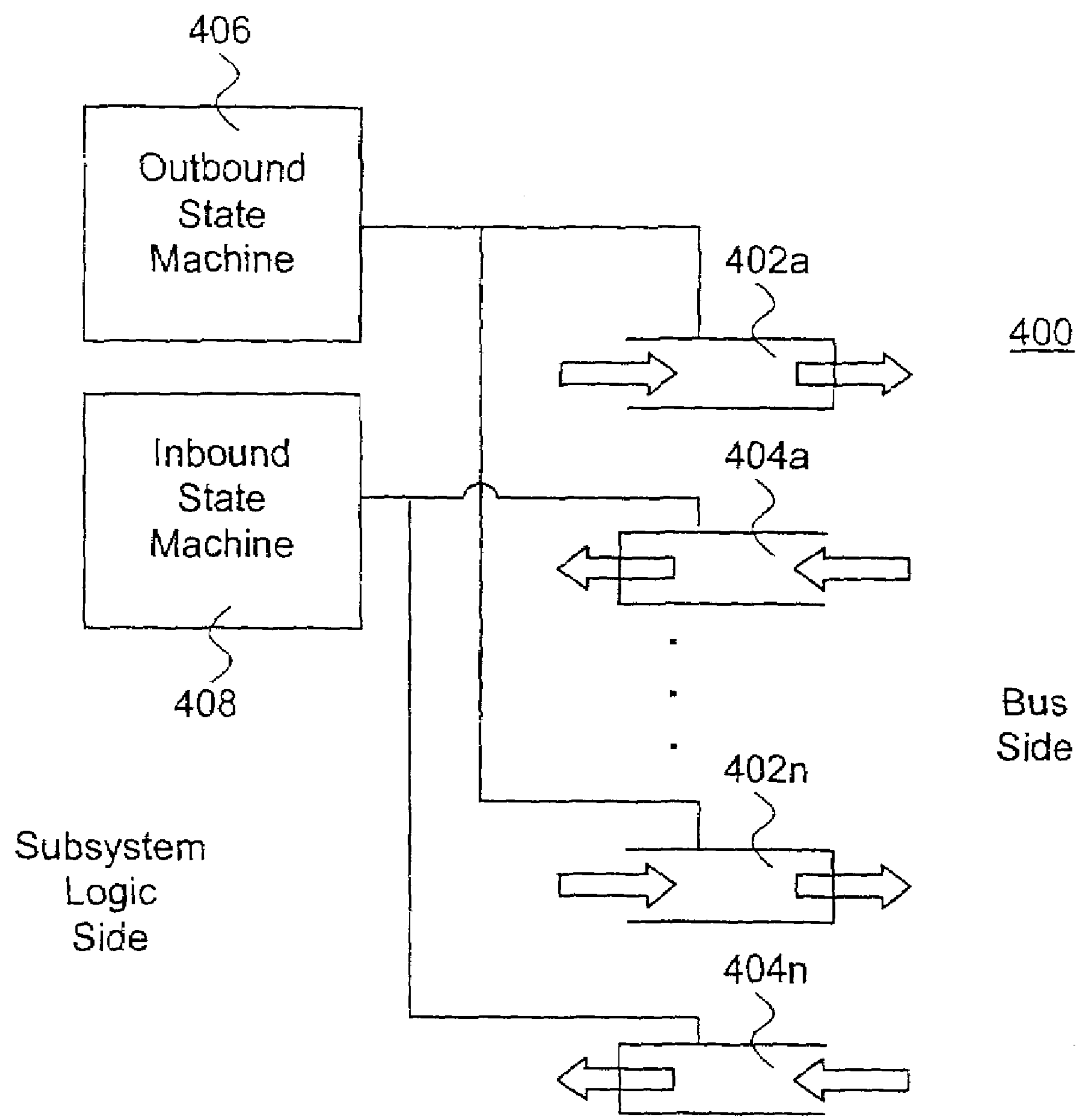
FIG. 4 illustrates data transfer unit of FIG. 1 in further detail, in accordance with one embodiment.

FIG. 4 illustrates DTU 108* in further details, in accordance with one embodiment. As illustrated, DTU 108* includes a number of pairs of outbound and inbound transaction queues 402* and 404*, one pair each for each priority level. For example, in one embodiment where DTU 108* supports three levels of priority, high, medium and low, DTU 108* includes three pairs of outbound and inbound transaction queues 402*a* and 404*a*, 402*b* and 404*b*, and 402*c* and 404*c*, one each for the high, medium and low priorities. In another embodiment, DTU 108* supports two levels of priority, high and low, DTU 108* includes two pairs of outbound and inbound transaction queues 402*a* and 404*a*, and 402*b* and 404*b*, one each for the high and low priorities. Of course, in other embodiments, DTU 108* may support more than three levels of priority or less than two levels of priority, i.e. no prioritization.

Additionally, DTU 108* includes outbound transaction queue service state machine 406 and inbound transaction queue service state machine 408, coupled to the transaction queues 402* and 404* as shown. Outbound transaction queue service state machine 406 services, i.e. processes, the transactions placed into the outbound queues 402* in order of the assigned priorities of the queues 402* and 404*, i.e. with the transactions queued in the highest priority queue being serviced first, then the transaction queued in the next highest priority queue next, and so forth.

For each of the transactions being serviced, outbound transaction queue service state machine 406 provides the control signals to the corresponding outbound queue 402* to output on the subsystem's request lines, the included bus arbitration priority of the first header of the "oldest" (in turns of time queued) transaction of the queue 402*, to arbitrate and compete for access to bus 104 with other contending transactions of other subsystems 102*. Upon being granted access to bus 104 (per the state of the subsystem's grant lines), for the embodiment, outbound transaction queue service state machine 406 provides the control signals to the queue 402* to output the remainder of the transaction, e.g. for the earlier described transaction format, the first header, the second header and optionally, the trailing data.

Similarly, inbound transaction queue service state machine 408 provides the control signals to the corresponding inbound queue 402* to claim a transaction on bus 104, if it is determined that the transaction is a new request transaction of the subsystem 102* or a reply transaction to an earlier request transaction of the subsystem 102*. Additionally, in one embodiment, if the claiming of a transaction changes the state of the queue 404* from empty to non-empty, inbound transaction queue service state machine 408 also asserts a "non-empty" signal for the core logic (not shown) of the subsystem 102*.

In due course, the core logic, in view of the "non-empty" signal, requests for the inbound transactions queued. In response, inbound transaction queue service state machine 408 provides the control signals to the highest priority non-empty inbound queue to cause the queue to output the "oldest" (in turns of time queued) transaction of the queue 404*. If all inbound queues 404* become empty after the output of the transaction, inbound transaction queue service state machine 408 de-asserts the "non-empty" signal for the core logic of the subsystem 102*.

Thus, under the present invention, a core logic of a subsystem 102* is not only able to influence the order its transactions are being granted access to bus 104, relatively to transactions of other subsystems 102*, through specification of the bus arbitration priorities in the transactions' headers, a core logic of a subsystem 102*, by selectively placing transactions into the various outbound queues 402* of its DTU 108*, may also utilize the facilities of DTU 108* to locally prioritize the order in which its transactions are to be serviced to arbitrate for access for bus 104.

Queue pair 402* and 404* may be implemented via any one of a number of "queue" circuitry known in the art. Similarly, state machines 406–408, to be described more fully below, may be implemented using any one of a number programmable or combinatory circuitry known in the art. In one embodiment, assignment of priorities to the queues pairs 402* and 404* are made by programming a configuration register (not shown) of DTU 108*. Likewise, such configuration register may be implemented in any one of a number of known techniques.

State Machines

Figure 5A:
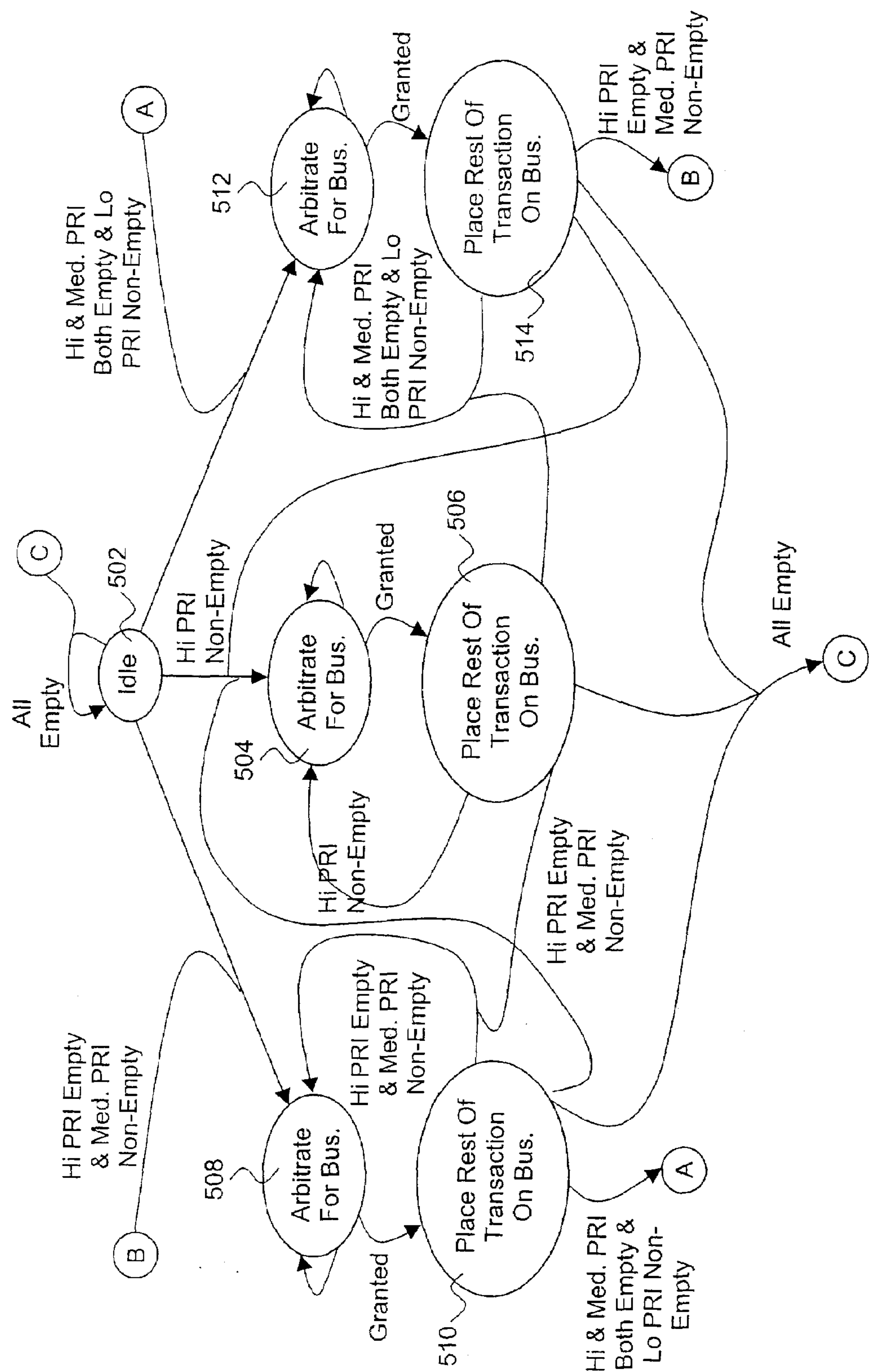
FIGS. 5*a*–5*b* illustrate the operational states and the transition rules for the state machines of FIG. 4, in accordance with one embodiment.
Figure 5B:
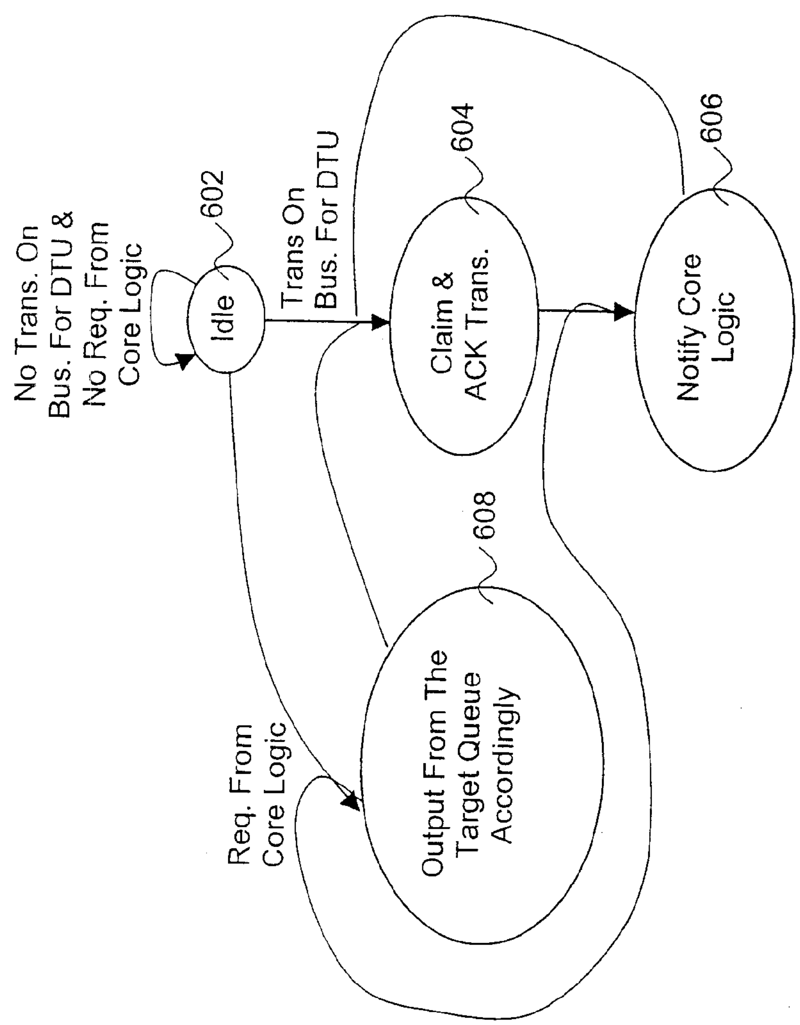

Referring now to FIGS. 5*a* and 5*b* wherein two state diagrams illustrating the operating states and transitional rules of state machines 406 and 408 respectively, in accordance with one embodiment, are shown. The embodiment assumes three pairs of queues 402*a* and 404*a*, 402*b* and 404*b*, and 402*c* and 404*c*, having three corresponding level of assign priorities, high, medium and low.

As illustrated in FIG. 5*a*, initially, for the embodiment, state machine 406 is in idle state 502. If state machine 406 detects that the high priority queue 402*a* is non-empty, it transitions to first arbitrate state 504, and arbitrate for access to bus 104 for the "oldest" (in terms of time queued) transaction queued in the high priority queue 402*a*. However, if while in idle state 502, state machine 406 detects that the high priority queue 420*a* is empty and the medium priority queue 402*b* is not empty, it transitions to second arbitrate state 508, and arbitrate for access to bus 104 for the "oldest" (in terms of time queued) transaction queued in the medium priority queue 402*b*. Similarly, if while in idle state 502, state machine 406 detects that both the high and medium priority queues 402*a*–402*b* are empty, and the low priority queue 402*c* is not empty, it transitions to third arbitrate state 512, and arbitrate for access to bus 104 for the "oldest" (in terms of time queued) transaction queued in the low priority queue 402*c*. If none of these transition conditions are detected, state machine 406 remains in idle state 502.

Upon arbitrating for access to bus 104 for the "oldest" (in terms of time queued) transaction queued in the highest priority queue 402*a* after entering first arbitrate state 504, state machine 406 remains in first arbitrate state 504 until the bus access request is granted. At such time, it transitions to first placement state 506, where it causes the granted transaction in the high priority queue 404*a* to be placed onto bus 104.

From first placement state 506, state machine 406 returns to one of the three arbitrate states 504, 508 and 512 or idle state 502, depending on whether the high priority queue 402*a* is empty, if yes, whether the medium priority queue 402*b* is empty, and if yes, whether the low priority queue 402*c* is also empty.

Similarly, upon arbitrating for access to bus 104 for the "oldest" (in terms of time queued) transaction queued in the medium priority queue 402*b* after entering second arbitrate state 508, state machine 406 remains in second arbitrate state 508 until the bus access request is granted. At such time, it transitions to second placement state 510, where it causes the granted transaction in medium priority queue 402*b* to be placed onto bus 104.

From second placement state 510, state machine 406 returns to one of the three arbitrate states 504, 508 and 512 or idle state 502, depending on whether the high priority queue 402*a* is empty, if yes, whether the medium priority queue 402*b* is empty, and if yes, whether the low priority queue 402*c* is also empty.

Likewise, upon arbitrating for access to bus 104 for the "oldest" (in terms of time queued) transaction queued in the low priority queue 402*c*, state machine 406 remains in third arbitrate state 512 until the bus access request is granted. At such time, it transitions to third placement state 514, where it causes the granted transaction in low priority queue 402*b* to be placed onto bus 104.

From third placement state 514, state machine 406 returns to one of the three arbitrate states 504, 508 and 512 or idle state 502, depending on whether the high priority queue 402*a* is empty, if yes, whether the medium priority queue 402*b* is empty, and if yes, whether the low priority queue 402*c* is also empty.

As illustrated in FIG. 5*b*, initially, for the embodiment, state machine 408 is also in idle state 602. While at idle state 602, if no transaction on bus 104 is addressed to the subsystem 102* (or one of the functions of the subsystem 102*, in the case of a reply transaction), nor are there any pending request for data from the core logic of the subsystem 102*, state machine 408 remains in idle state 602.

However, if the presence of a transaction on bus 104 addressed to the subsystem 102* (or one of the functions of the subsystem 102*, in the case of a reply transaction) is detected, state machine 408 transitions to claim state 604, where it provides control signals to the appropriate queue 404* to claim the transaction, and acknowledges the transaction.

If claiming of the transaction changes the state of the queues from all empty to at least one queue not empty, state machine 408 transitions to the notify state 606, in which it asserts the "non-empty" signal for the core logic of subsystem 102*, as earlier described.

From notify state 606, state machine 408 transitions to either claim state 604 if there is another transaction on bus 104 addressed to the subsystem 102* (or a function of the subsystem 102*, in case of a reply), or output state 608, if there is a pending request for data from the core logic of the subsystem 102*. From output state 608, state machine 408 either transitions to claim state 604 another transaction on bus 104 addressed to the subsystem 102* (or a function of the subsystem 102*, in case of a reply) is detected, remains in output state 608 if there is no applicable transaction on bus 104, but request for data from the core logic is outstanding, or returns to idle state 602, if neither of those two conditions are true.

Bus Signals, Timing and Rules

In one embodiment, the bus signals supported are as follows:

| Signal Name | Signal Width | Description |
|---|---|---|
| MSCLK | 1 | Bus Clock (e.g. 25–100 MHz) |
| MSRST | 1 | System Bus Reset |
| MSAD[31:0] | 32 | Address/Data (tri-state, bi-directional) |
| MSCYC | 1 | Shared among subsystems to denote master bus cycles |
| MSREQ-1:0] | pair for each subsystem | Bus request, 2 per subsystem to gain ownership of bus |
| MSGNT | # of subsystems | Bus grant - signifies subsystem own the bus |
| MSSEL | 1 | Slave select - signifies subsystem has been selected (tri-state) |
| MSRDY | 1 | Master ready-signifies master data ready on the bus (tri-state) |
| MSBSY | 1 | Slave select-signifies subsystem has been selected (tri-state) |
| MSINT | # of subsystems | Interrupt request |

In one embodiment, the request codes supported are as follows:

| Req[1:0] | Request Type |
|---|---|
| 00 | Idle - no request |
| 01 | Low priority ("conventional" Data) |
| 10 | Medium priority (Control) |
| 11 | High priority (Voice and Replies) |

Figure 6A:
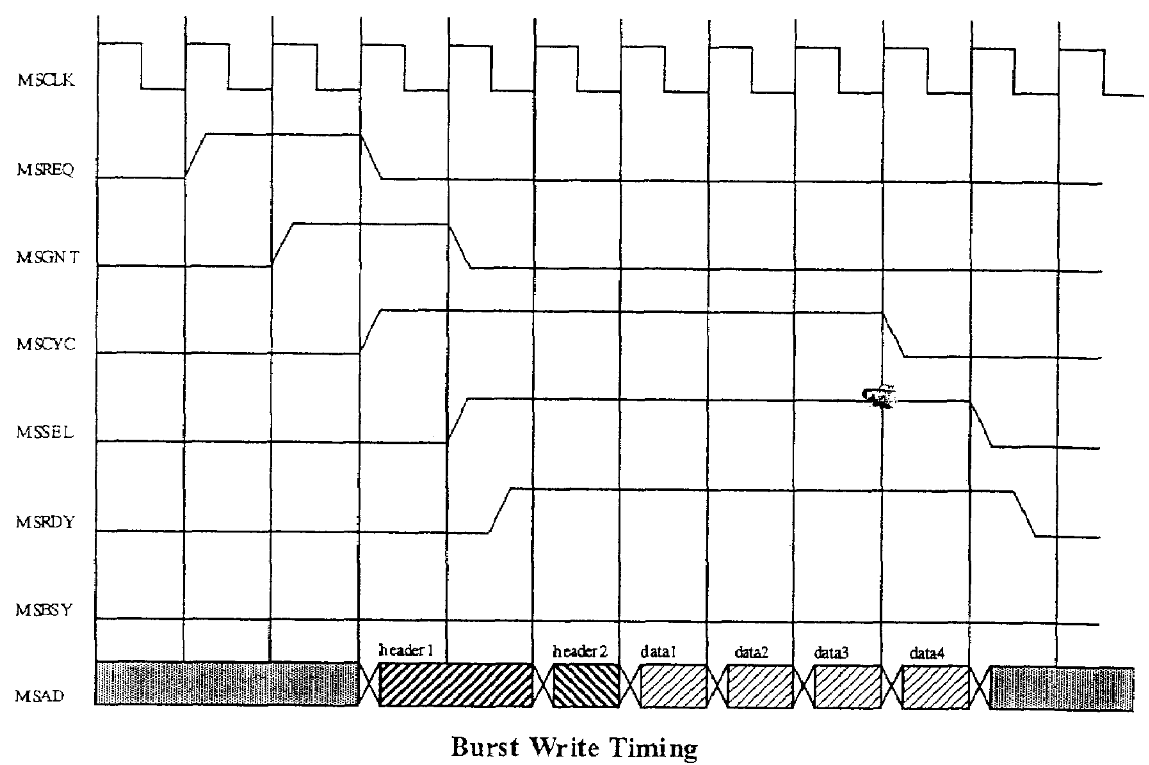
FIGS. 6*a*–6*c* are timing diagrams for practicing the present invention, in accordance with one implementation.
Figure 6B:
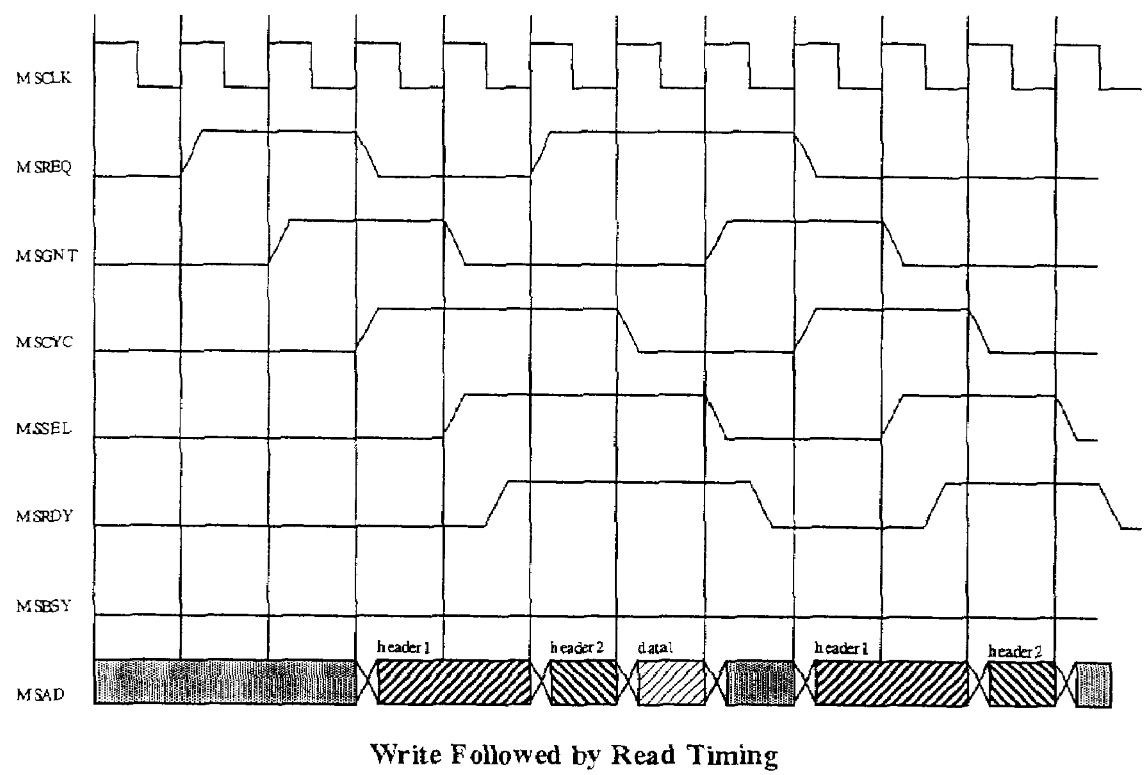
Figure 6C:
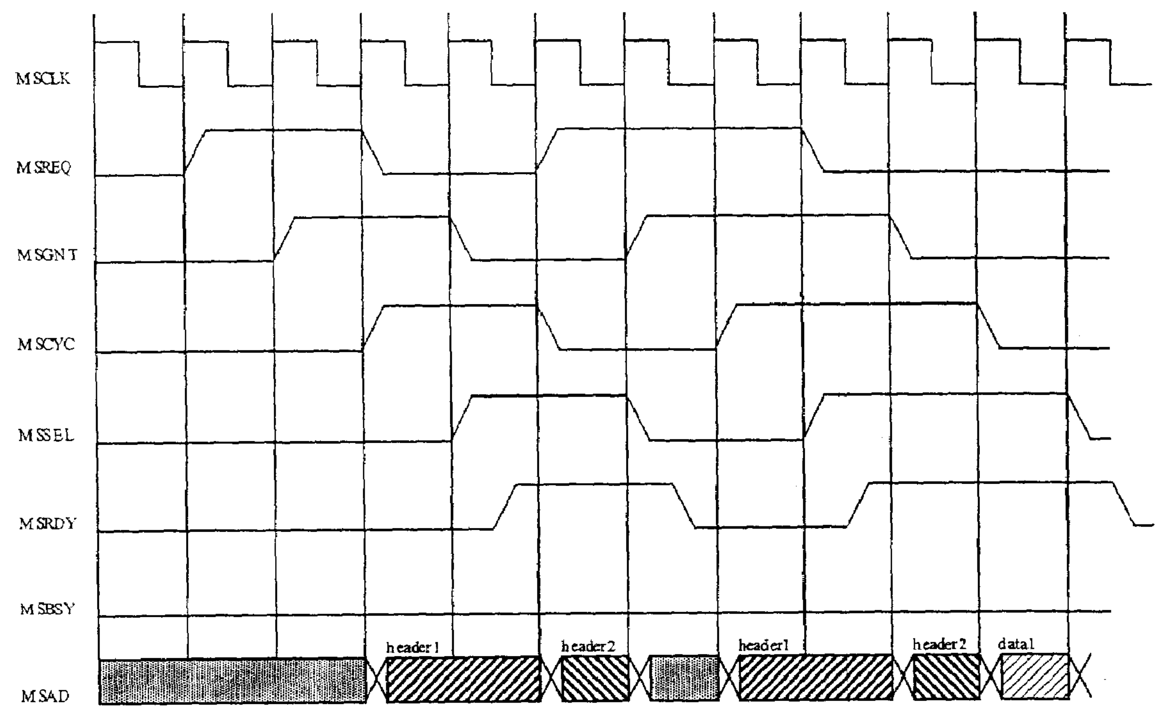

FIGS. 6*a*–6*c* are three timing diagrams illustrating the timings of the various signals of the above described embodiment, for burst write timing, write followed by read timing and read followed by write timing (different subsystems) respectively.

In one embodiment, the maximum burst transfer size is 64-bytes of data (+8 bytes for the transaction header). The subsystems guarantee the burst transfers to be within a page. The slave devices would accept the maximum sized transfer (64 bytes+header) before generating the above described MSSEL signal.

In one embodiment, each data transfer unit would permit only one Read request to be outstanding. If a Read request is pending, the subsystem would not accept requests from other masters until the reply to the outstanding Read request has been received. This advantageously prevents a deadlock condition. The subsystem may, however, continue to generate write requests.

In alternate embodiments, the present invention may be practiced with other approaches being employed to address these and other operational details.

CONCLUSION AND EPILOGUE

Thus, it can be seen from the above descriptions, an improved method and apparatus for inter-subsystem communication between subsystems of a SOC has been described. The novel scheme advantageously enables the core logic of the subsystems to operate in different clock domains. Moreover, the novel scheme enables subsystems to be flexibly added to or removed from a particular implementation of the SOC. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. A data transfer block for use in an integrated circuit (IC) to interface an on-chip subsystem to an on-chip bus, the data transfer block comprising:

a first and a second outbound queue to facilitate staging of a first and a second plurality of outbound bus transactions for the on-chip subsystem, each of said outbound bus transactions including a bus arbitration priority; and a first state machine coupled to the first and second outbound queues to service the first and second outbound queues by according the first queue a first outbound priority and the second queue a second outbound priority, and requesting for access to the on-chip bus for the staged outbound bus transactions based at least in part on accorded outbound priorities, where access to the on-chip bus is granted to requesting bus transactions based at least in part on the included bus arbitration priorities of the contending bus transactions.

2. The data transfer block of claim 1, wherein said data transfer block further comprises a configuration register coupled to said first state machine to store said first and second priorities to be accorded to said first and second outbound queues by said first state machine in servicing said first and second outbound queues.

3. The data transfer block of claim 1, wherein the data transfer block further comprises:

a first and a second inbound queue to facilitate staging of a first and a second plurality of inbound bus transactions for the on-chip subsystem, each of the inbound bus transaction including a bus arbitration priority and being granted access to the on-chip bus based at least in part on the included bus arbitration priority; and a second state machine coupled to the first and second inbound queues to service the first and second inbound queues, bringing the staged inbound bus transactions to the attention of the on-chip subsystem, according the first inbound queue a first inbound priority and the second inbound queue a second inbound priority.

4. The data transfer block of claim 3, wherein said data transfer block further comprises a configuration register coupled to said second state machine to store said first and second inbound priorities to be accorded to said first and second inbound queues by said second state machine in servicing said first and second inbound queues.

5. A data transfer block for use in an integrated circuit (IC) to interface an on-chip subsystem to an on-chip bus, the data transfer block comprising:

a first and a second inbound queue to facilitate staging of a first and a second plurality of inbound bus transactions for the on-chip subsystem, each of the inbound bus transactions including a bus arbitration priority and being granted access to the on-chip bus based at least in part on the included bus arbitration priority; and a state machine coupled to the first and second inbound queues to service the first and second inbound queues by according the first inbound queue a first inbound priority and the second inbound queue a second inbound priority and bringing the staged inbound bus transactions to the attention of the on-chip subsystem based at least in part on the accorded inbound priorities.

6. The data transfer block of claim 5, wherein said data transfer block further comprises a configuration register coupled to said state machine to store said first and second inbound priorities to be accorded to said first and second inbound queues by said state machine in servicing said first and second inbound queues.

7. A subsystem of an integrated circuit, the subsystem comprising:

core subsystem logic; and a data transfer unit to couple the core subsystem logic to an on-chip bus of the integrated circuit, the data transfer unit including:

a first and a second outbound queue to facilitate staging of a first and a second plurality of outbound bus transactions for the core subsystem logic, each of said outbound bus transactions including a bus arbitration priority; and a first state machine coupled to the first and second outbound queues to service the first and second outbound queues by according the first queue a first outbound priority and the second queue a second outbound priority, and requesting for access to the on-chip bus for the staged outbound bus transactions based at least in part on accorded outbound priorities, where access to the on-chip bus is granted to requesting bus transactions based at least in part on the included bus arbitration priorities of the contending bus transactions.

8. The subsystem of claim 7, wherein said data transfer unit further comprises a configuration register coupled to said first state machine to store said first and second priorities to be accorded to said first and second outbound queues by said first state machine in servicing said first and second outbound queues.

9. The subsystem of claim 7, wherein the data transfer unit further comprises:

a first and a second inbound queue to facilitate staging of a first and a second plurality of inbound bus transactions for the core subsystem logic, each of the inbound bus transaction including a bus arbitration priority and being granted access to the on-chip bus based at least in part on the included bus arbitration priority; and a second state machine coupled to the first and second inbound queues to service the first and second inbound queues, bringing the staged inbound bus transactions to the attention of the core subsystem logic, according the first inbound queue a first inbound priority and the second inbound queue a second inbound priority.

10. The subsystem of claim 9, wherein said data transfer block further comprises a configuration register coupled to said second state machine to store said first and second inbound priorities to be accorded to said first and second inbound queues by said second state machine in servicing said first and second inbound queues.

11. The subsystem of claim 7, wherein the subsystem is a memory controller, a security engine, a voice processor, a collection of peripheral device controllers, a framer processor, or a network media access controller.

12. A subsystem of an integrated circuit, the subsystem comprising:

core subsystem logic; and a data transfer unit to couple the core subsystem logic to an on-chip bus of the integrated circuit, the data transfer unit including:

a first and a second inbound queue to facilitate staging of a first and a second plurality of inbound bus transactions for the core subsystem logic, each of the inbound bus transaction including a bus arbitration priority and being granted access to the on-chip bus based at least in part on the included bus arbitration priority; and a state machine coupled to the first and second inbound queues to service the first and second inbound queues by according the first inbound queue a first inbound priority and the second inbound queue a second inbound priority and bringing the staged inbound bus transactions to the attention of the on-chip subsystem based at least in part on the in bound priority.

13. The subsystem of claim 12, wherein said data transfer unit further comprises a configuration register coupled to said state machine to store said first and second inbound priorities to be accorded to said first and second inbound queues by said state machine in servicing said first and second inbound queues.

14. The subsystem of claim 12, wherein the subsystem is a selected one of a memory controller, a security engine, a voice processor, a collection of peripheral device controllers, a framer processor, and a network media access controller.

* * * * *